United States Patent [19]

Johnston

[11] 4,116,294
[45] Sep. 26, 1978

[54] TORQUE EQUALIZER FOR A HYDRAULICALLY DRIVEN, FOUR-WHEEL-DRIVE VEHICLE

[75] Inventor: Otis A. Johnston, League City, Tex.

[73] Assignee: Western Geophysical Company of America, Houston, Tex.

[21] Appl. No.: 771,217

[22] Filed: Feb. 23, 1977

[51] Int. Cl.² .................. B60K 17/10; B60K 17/34
[52] U.S. Cl. .................. 180/44 F; 60/421; 137/112; 180/66 R
[58] Field of Search ......... 180/44 F, 66 R, 6.48; 60/420, 430, 484, 486, 456, 421; 137/100, 101.11, 112

[56] References Cited

U.S. PATENT DOCUMENTS

| | | | |
|---|---|---|---|
| 3,641,765 | 2/1972 | Hancock | 60/484 |
| 3,724,583 | 4/1973 | Caldwell | 180/66 R |
| 3,795,107 | 3/1974 | Ward | 60/420 |
| 3,862,668 | 1/1975 | Ward | 180/6.48 |
| 3,987,626 | 10/1976 | Bianchetta | 60/486 |
| 4,002,027 | 1/1977 | Eley | 60/486 |
| 4,019,596 | 4/1977 | Crull | 180/6.48 |
| 4,040,254 | 8/1977 | Knapp | 60/484 |

Primary Examiner—Kenneth H. Betts
Attorney, Agent, or Firm—William A. Knox

[57] ABSTRACT

A two-axle, four-wheel-drive vehicle has separate hydraulic drive systems to drive the front and rear pairs of traction wheels. Each drive system includes a hydraulic motor that is powered by its own variable displacement pump. The torque developed by the motors, and the hydrostatic drive pressure, depend on the volume of fluid flow from the pumps. Under certain conditions, the hydrostatic drive pressure to the two motors becomes unbalanced. A torque equalizer valve is interconnected between the two hydraulic drive systems. When the equalizer valve senses a hydrostatic drive pressure difference between the two drive systems, it readjusts the displacement of the pump having the higher pressure by lowering the hydrostatic pilot pressure to restore the balance of hydrostatic drive pressures.

7 Claims, 8 Drawing Figures

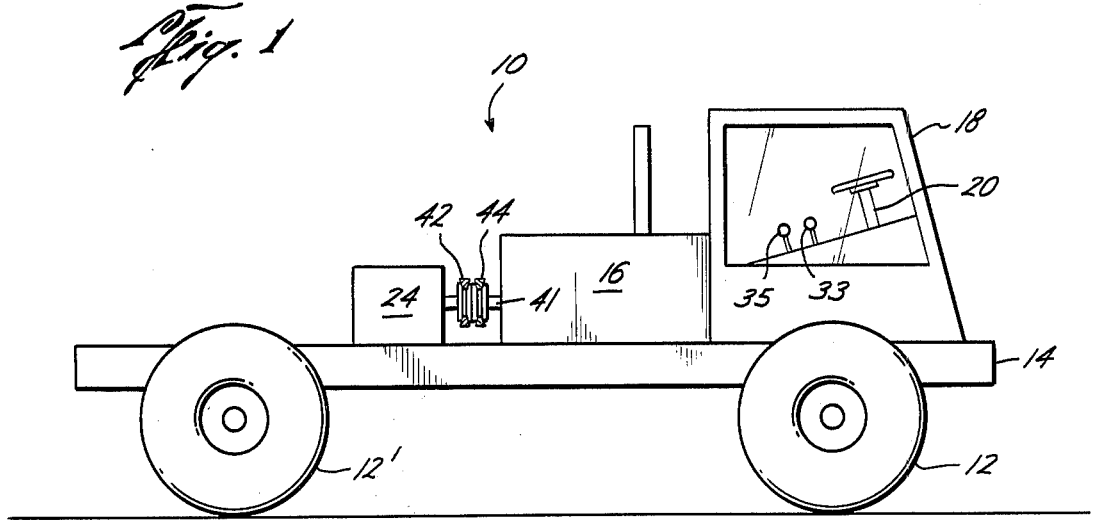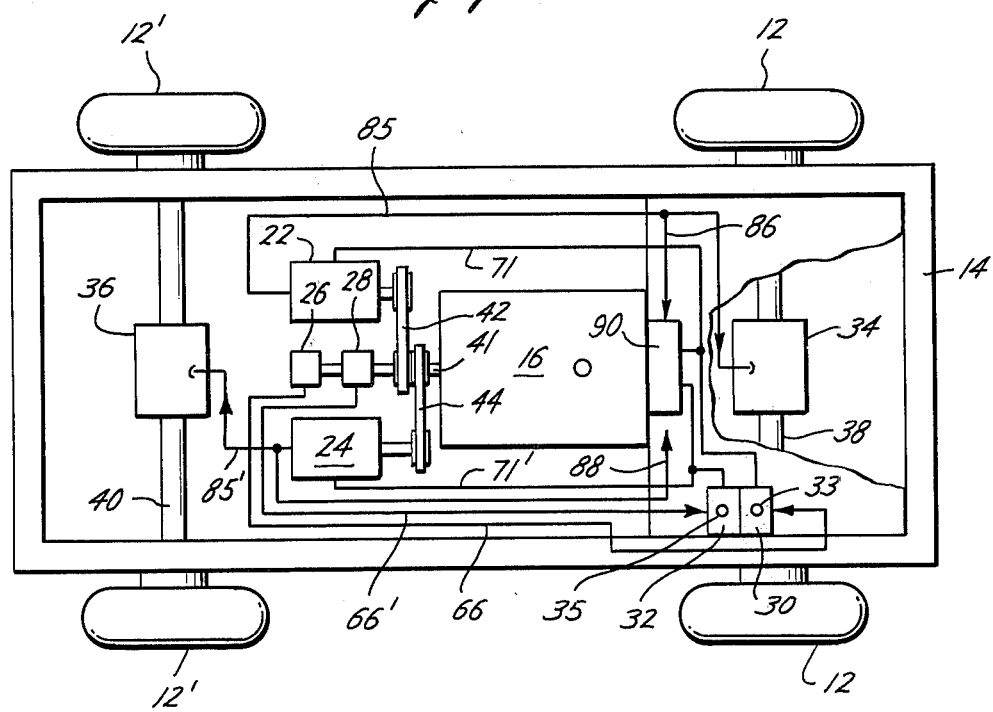

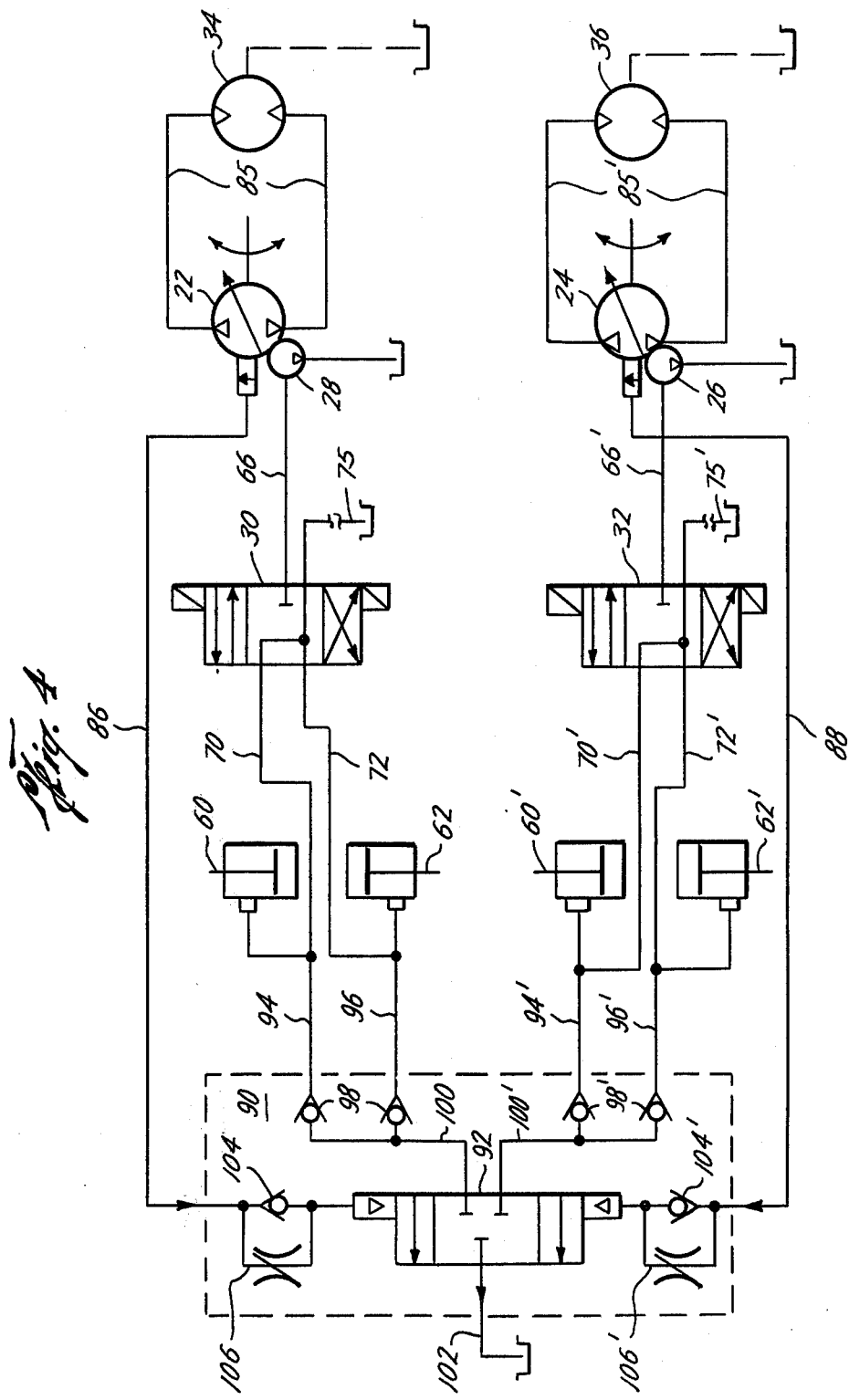

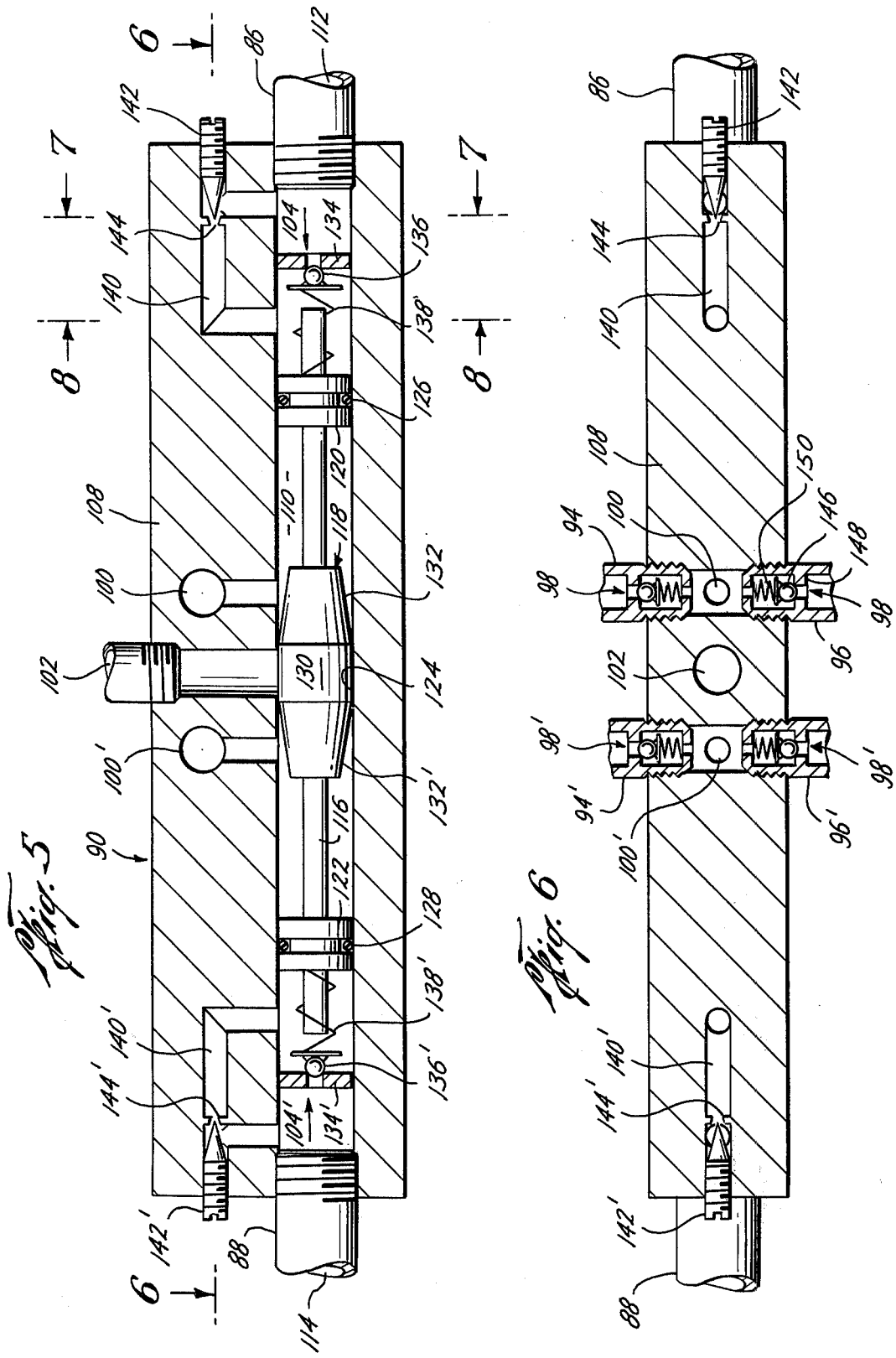

TORQUE EQUALIZER FOR A HYDRAULICALLY DRIVEN, FOUR-WHEEL-DRIVE VEHICLE

BACKGROUND OF THE INVENTION

1. Field of the Invention

This invention relates to four-wheel drive, hydraulically driven vehicles and a control system to equalize the torque between front and rear drive wheels.

2. Description of the Prior Art

Heavy vehicular equipment designed primarily for off-road duty is commonly hydraulically driven. One such vehicle, used in seismic exploration for oil, is disclosed in U.S. Pat. No. 3,905,466, assigned to the assignee of this invention. Such vehicles have two or more axles, each of which supports a pair of single or dual traction wheels, generally rubber-tired. Each pair of wheels is driven by a hydraulic motor thorugh a differential reduction gear.

The hydraulic motors are supplied with hydraulic drive fluid from a hydraulic pump. The pump, in turn, is usually powered by a prime mover such as a gasoline or diesel-fueled engine.

In the case where a single pump supplies two or more hydraulic motors, if one traction wheel spins out, all of the hydraulic fluid is diverted to the motor that drives the spinning wheel. No power reaches the other wheels and consequently the vehicle is stalled. Accordingly, each motor is driven by a separate pump. The two pumps of course, may be driven from a common drive shaft of the prime mover.

When two independent pumps deliver hydraulic power to the motors that drive the traction wheels, the hydrostatic drive pressures in the two systems must be the same. In the absence of pressure equalization between the two systems, the drive system having the greater hydrostatic pressure will develop more torque; the associated traction wheels will turn faster than the wheels associated with the system having the lesser torque. The slower pair of traction wheels will apply a counter torque to the corresponding drive motor which then tends to act as a dynamic brake. The slower wheels will drag to cause excessive tire wear, destruction of the roadway, and overall loss of power.

Many factors contribute to an unbalance in the hydrostatic drive pressure, for example, uneven tire sizes, differential wheel rotation during turns, mechanical inaccuracies in matching two different pumps or motors, and unequal-length plumbing runs to the two systems wherein fluid friction impedes the flow of hydraulic fluid in the longer hydraulic line.

As an example of a mechanical problem, in one vehicle, it was found that the same pilot pressure applied to the swash plate servo positioners of two different pumps, imparted a one-half degree greater tilt to the front pump swash plate than to that of the rear pump. Parenthetically, it may be noted that a "swash plate" is employed in a hydraulic pump to control, the pump displacement and hence the volume (and pressure) of hydraulic fluid applied to the motors. A change in the angle of the swash plate controls the pump displacement by changing the stroke of pump pistons mounted in a rotating cylinder block. In the example at operating pressure, the one-half degree difference in the swash plate tilt changed the pump displacement so that the front pump discharged 1.5 gallons per minute more fluid than the rear pump. The front drive motor accordingly rotated 63 revolutions per minute (rpm) faster than the rear motor. Reduced by the differential gear ratio of 19:1 the front wheels rotated 3.32 rpm faster than the rear wheels. The above situation resulted in a severe power loss and roadway damage. To overcome the problem the hydrostatic drive pressures in the two systems had to be equalized.

One method for pressure equalization is disclosed in U.S. Pat. No. 3,724,583, with particular reference to FIG. 9 and Col. 9, lines 1-27 of the patent. In this patent, a pressure equalizing spool valve is connected between the two hydraulic drive systems. An excess of pressure in one system causes the spool to move in the direction of lower pressure, which opens a port to allow the fluid having the higher pressure to bleed into the system having the lower pressure.

There are disadvantages to the above-cited pressure equalization system. The drive pressure lines are directly interconnected with each other through the valve. If one set of wheels slips, the other set will lose power as described earlier for the case of two motors and one pump.

For an equalizer valve of manageable size, the various passageways in the valve and valve spool must be relatively restricted. At a normal operating pressure of several thousand pounds per square inch, and with the volume of fluid that must flow back and forth between the two drive systems of the reference, a very considerable amount of undesirable heat will be developed. Furthermore, no means is disclosed for damping movement of the spool to prevent hunting.

Finally, the system disclosed in the patent is a "brute force" device. Fine control of the pressure balance between systems is not possible.

SUMMARY OF THE INVENTION

It is an object of this invention to equalize the torque developed by two independently-powered hydraulic motors. Each motor is driven by pressurized hydraulic fluid delivered to the motors by a corresponding variable-displacement hydraulic pump, through a drive pressure line. A torque equalizer valve is interconnected between the two hydraulic drive systems. When the valve senses a hydrostatic pressure differential between the drive pressure lines, it reduces the displacement of the pump having the higher pressure, thereby restoring the pressure balance.

In a preferred embodiment, the torque equalizer valve is a normally closed spool valve having two drive pressure ports, two pilot pressure inlet ports and a central pilot pressure outlet port midway between the two pilot pressure inlet ports. The two drive pressure ports are in fluid communication with the drive pressure lines of the two hydraulic drive systems. The pilot pressure inlet ports are in fluid communication with swash plate servo positioners of the respective variable displacement pumps.

The equalizer valve includes a body having a longitudinal bore, the opposite openings of which constitute the drive pressure ports. A spindle having a center spool and two piston spools, one on each end, is slidingly mounted within the bore. The piston spools are spaced apart from the center spool. Annular chambers are defined by the wall of the bore around the spindle between the center spool and each piston spool. The external end faces of the piston spools are exposed to the hydrostatic drive pressure through the drive pressure ports. The annular chambers are sealed from fluid communication with each other and from the hydrostatic drive pressure. When the hydrostatic drive pressures are balanced, the spool floats in the center or neutral position and the center spool closes the pilot pressure relief outlet port. An excess of pressure at one "upstream" drive pressure port, acting against the corresponding external piston-spool end face, displaces the spindle "downstream" towards the drive pressure port having the lower hydrostatic drive pressure. Displaced from neutral, the center spool opens the outlet relief port to allow fluid communication between it and the "upstream" pilot pressure inlet port, through the associated annular chamber. When the outlet port is open, the upstream hydrostatic pilot pressure bleeds off to drain to reduce the displacement of the corresponding variable displacement pump. Reduction of the pump displacement reduces the higher hydrostatic drive pressure until the hydrostatic drive pressures in the two drive pressure lines are again in balance, allowing the spool to return to neutral.

In accordance with one aspect of this invention, the center spool is tapered to permit vernier control of the rate of change of the pilot pressures and to limit the amount of pressure equalization to a desired percentage of the total hydrostatic drive pressure differential.

In accordance with another aspect of this invention, each drive pressure port is provided with an adjustable metering orifice to damp the spindle motion to prevent the spindle from hunting.

In accordance with a further aspect of this invention, the variable displacement pumps are of the rotary axial type and the servo controls are swash plate servo positioners.

In an important embodiment of this invention the torque equalizer valve equalizes the torque applied to the front and rear drive wheels of a four wheel drive, two axle vehicle.

BRIEF DESCRIPTION OF THE DRAWINGS

These and other advantages and objectives of this invention will be better understood from the attached description and the drawings wherein;

FIG. 1 is a side view of a four-wheel-drive, hydraulically driven vehicle employing the torque equalizer valve;

FIG. 2 is a top, partially cutaway view of the vehicle of FIG. 1 showing schematically a simplified arrangement of the drive units and hydraulic plumbing;

FIG. 4 is a schematic plumbing diagram of the system;

FIG. 5 is a cross sectional view of the torque equalizer valve;

FIG. 6 is a cross section of the torque equalizer valve taken along line 6—6 of FIG. 5;

DETAILED DESCRIPTION OF THE PREFERRED EMBODIMENT

Figure 3:
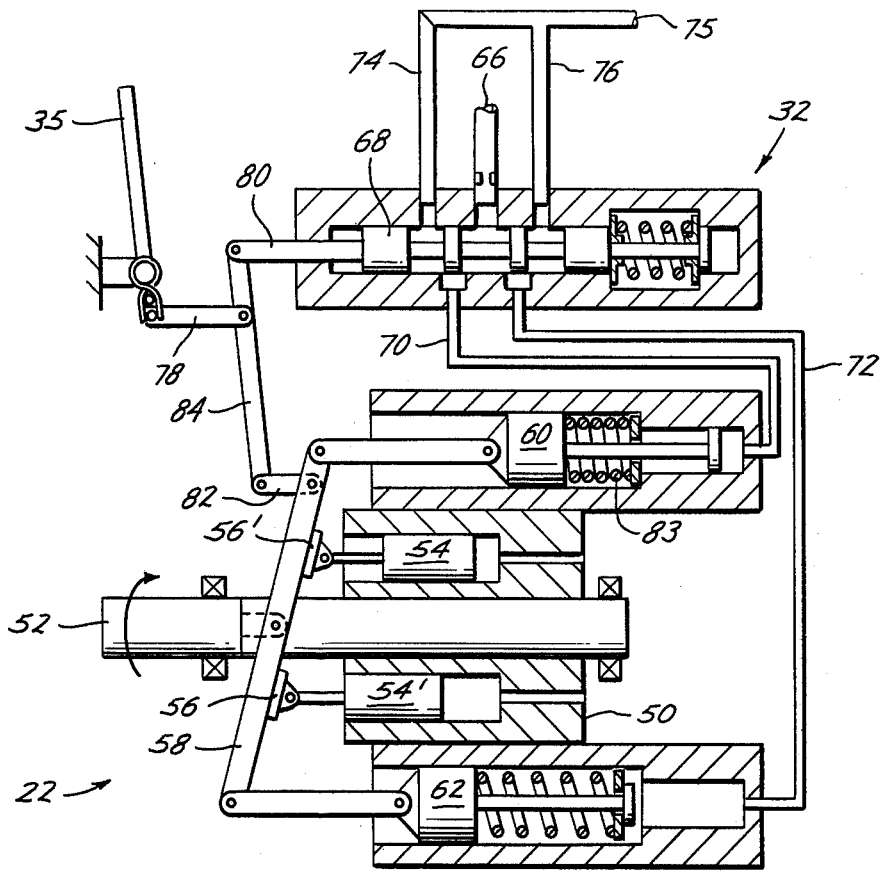
FIG. 3 illustrates the operating principles of a known variable displacement hydraulic pump.

The hydraulically-driven, four-wheel-drive vehicle 10 in FIGS. 1 and 2 includes front and rear drive wheels 12, 12' that support a chassis 14. Alternatively, the drive wheels could be replaced by track-type crawler assemblages. Mounted on chassis 14 are a prime mover 16, such as a gasoline or diesel engine, a cab 18, steering device 20, front and rear hydraulic drive pumps 22, 24, and pump controllers 30, 32 for the two pumps. External charge pumps 26, 28 are shown in FIG. 2 but the pumps may also be mounted inside the housings of the drive pumps 22, 24. Charge pumps provide the pilot pressure to actuate the swash-plate servo positioners which will be described later. The drive pumps 22, 24 are driven by the output shaft 41 of the prime mover 16 by any convenient means such as by V-belts 42, 44. The charge pumps are shown to be directly coupled to output shaft 41.

Hydraulic motors 34, 36 of any well known type, such as a Rockwell Model PR-75, drive front and rear wheels 12, 12' through conventional differentials and axles (not shown) inside axle housings 38, 40. Each of the motors is driven by pressurized hydraulic fluid from a corresponding hydraulic pump. The torque applied to wheels 12, 12' by motors 34, 36, depends upon the hydrostatic drive pressure that is delivered by the associated pump. The drive pressure may be varied from 0 to as much as 5000 pounds per square inch (psi) by changing the pump displacement. In a variable displacement pump such as a Sunstrand Model 23, the pump displacement is changed by altering the tilt angle of a swash plate by hydraulic servo positioners in a manner now to be described.

Reference is now made to FIG. 3 which is a greatly simplified diagram to illustrate the operating principles of a typical variable displacement, rotary axial pump such as 22. A rotary cylinder block 50 is affixed to and turned by pump drive shaft 52. Pistons such as 54, 54', slidingly mounted in cylinder block 50, are provided with shoes 56, 56' which bear against a tiltable, non-rotating swash plate 58. As cylinder block 50 rotates, each piston 54 slides to and fro within its corresponding cylinder. The piston stroke length depends upon the tilt angle of swash plate 58. When swash plate 58 is exactly perpendicular to drive shaft 52, there is, of course, no piston motion. Thus the pump displacement is controlled by the swash-plate tilt angle.

Swash plate 58 is set to a desired angle by spring-loaded servo positioners 60, 62. The servo positioners are actuated by applying hydraulic fluid under a hydrostatic pilot pressure of 50–170 psi from a charge pump such as 26 (FIG. 1) through a control valve 32. In neutral, no pilot pressure is applied to either servo positioner 60, or 62. In this status, the swash plate tilt angle is zero degrees.

The position of valve spool 68 in a control valve such as 32 (FIG. 1) is controlled by control lever 35 through linkages 78 and 80 by the swash plate feedback linkages 82 and 84. When control lever 35 is first moved to the left, valve spool 68 is moved to the right through mechanical linkages 78 and 80. When valve spool 68 moves to the right, it blocks off drain port 76 from fluid communication with pilot pressure line 72. Pilot pressure is now applied to servo positioner 62, through pilot pressure line 72, causing the positioner to move leftwards against the force due to compression spring 83 in the opposite servo positioner 60. Of course when valve spool moves to the right, the pilot pressure in pilot pressure line 70 is relieved to drain through the now-open drain port 74. Drain ports 74 and 76 are connected to a common drain line 75. When the bottom of swash plate 58 is forced to the left by positioner 62, feedback linkages 82, 84 tend to return valve spool 68 back towards neutral. By virtue of the design of the mechanical linkages that interconnect control lever 35, swash plate 58, and valve spool 68, for any position of control lever 35 except neutral, a positive pilot pressure is applied to one of two servo positioners in order to hold swash plate 58 at the desired angle against the force of the spring 83 in the opposite servo positioner. The other positioner is open to drain.

In summary, the pump displacement and hence its fluid output is proportional to the pilot pressure differential applied across the servo positioners. One of the two pilot pressure lines 70 or 72 is always under pressure when vehicle 10 is moving, whereas the other pilot pressure line is open to drain. In the above example, the application of the pilot pressure was controlled by the position of a manual control lever. Other more elegant controllers employing electro-mechanical feedback are well known such as the Moog Model 62-600 controller, made by Moog Inc. of East Aurora, N.Y.

As outlined above, the torque developed by motors 34, 36 is proportional to the hydrostatic drive pressure delivered to the motors 34, 36 by pumps 22, 24 through lines 85, 85'. The drive pressure is proportional to pump displacement. Pump displacement is adjusted by the pilot pressure differential that is applied to the servo positioners of each pump. Each pump-motor combination is an independent closed system. But for a viable, practical vehicle, the torques developed by each motor must be the same. In this invention a torque equalizer valve senses any imbalance in the hydrostatic drive pressures in the two systems. The torque equalizer valve corrects any such hydrostatic drive pressure imbalance by readjusting the pilot pressure applied to the servo positioner of the pump delivering the greater hydrostatic drive pressure. The drive pressure equalization is accomplished independently of and in parallel with the settings of the drive control levers 33, 35, as will now be described.

The right hand side of FIG. 4 illustrates symbolically the functions and features of the system described in connection with FIGS. 1, 2, and 3. Similar numbers are used to designate like parts in the drawings with the following exceptions: Primed numbers refer to the rear drive system. Each pump-motor circuit forms a closed hydraulic loop; the single drive pressure lines 85, 85' as shown in FIG. 2 are actually a pair of lines as shown in FIG. 4. The separate pilot pressure lines 70, 72 of FIGS. 3 and 4 are shown as a single pilot pressure line 71 in FIG. 2. Servo positioners 60, 62, for clarity, are shown displaced away from the pump symbols in FIG. 4 whereas in actuality they are an integral part of the pumps as shown in FIG. 3.

Operation of the conventional part of the front and rear drive systems (the right hand two thirds of FIG. 4) having already been described above, attention is now directed to the operation of torque equalizer valve 90, enclosed by the dashed rectangle on the left of FIG. 4.

Torque equalizer valve 90 includes a one way, two-position pressure centered, normally closed spool valve 92. The hydrostatic drive pressure developed by pumps 22, 24 in drive pressure lines 85, 85' is applied to opposite sides of spool valve 92 through lines 86, 88. When the drive pressures in the front and rear drive systems are equal, spool valve 92 is closed. Pilot pressure relief lines 94, 96, 94', 96' are connected in parallel to pilot pressure lines 70, 72, 70', 72' respectively. Spool valve 92 is provided with pressure relief inlet ports 100, 100' and a pressure relief outlet port 102. Pilot pressure relief lines 94, 96, 94', 96' are connected to pressure relief inlet ports 100, 100' through check valves 98, 98'.

When the hydrostatic drive pressure in, say, the front drive system exceeds that of the rear drive system, the valve spool spindle (not shown in FIG. 4) in spool valve 92 moves to open pilot pressure relief inlet port 100 for fluid communication with pilot pressure relief outlet port 102. As the pilot pressure is relieved from one of the front servo positioners 60, 62, the displacement of pump 22 is decreased to equalize the pressure between the two systems after which, spool valve 92 closes.

Pressure equalization valve 90 includes spring-loaded check valves 104, 104' in the drive-pressure inlets of spool valve 92. The check valves are bypassed by an adjustable metering orifice 106, 106'. When, as in the above example, the internal valve spool of spool valve 92 moves downwards, the back pressure created by the valve spool movement is blocked by check valve 104'. The back pressure is however relieved through adjustable metering orifice 106'. Provision of the check-valve bypass combination is necessary to prevent hunting of the valve spool as will next be described.

FIG. 5 shows the mechanical construction of torque equalizer valve 90. The valve includes a valve body 108 having a longitudinal bore 110. The opposite ends of longitudinal bore 110 define drive pressure inlet ports 112, 114 which are in fluid communication with drive pressure lines 86, 88. A spindle 116 having a center spool 118 and two piston spools 120, 122 near each end, is slidably mounted within bore 110. Annular chambers are defined between the center spool 118 and each end spool 120, 122 by the wall 124 of bore 110. The annular chambers are sealed from fluid communication with drive pressure inlet ports 112, 114 by O-rings 126, 128. Center valve spool 118 is flat over a central portion 130 of its surface, sufficient to seal and close pilot pressure relief outlet port 102. The outer ends 132, 132' of the spool are tapered about 2° although more or less taper could be used. The function of the taper will be discussed later. Center spool 118 is lapped to provide a snug fit to the wall 124 of longitudinal bore 110. In the center or closed position, the snug fit seals outlet port 102 from any substantial fluid communication with pilot pressure inlet port 100, 100'.

Spring-loaded check valves 104, 104' are mounted in each end of bore 110 in valve body 108. The check valves include a seat 134, 134', balls 136, 136' mateable with seats 134, 134' and retaining springs, 138, 138'. Although springs 138, 138' would tend to center spindle 116, the springs are relatively weak and their primary function is to hold balls 136, 136' against the corresponding seats 134, 134'.

Bypass lines 140, 140' relieve the back pressures due to movements of spindle 116. Needle valves 142, 142' restrict reverse flow of fluid through orifices 144 or 144' to prevent hunting, when spindle 116 moves in response to a drive pressure difference.

FIG. 6 is a cross section of the valve taken along the line 6—6 to show positioning of check valves 98, 98' and the connections to the pilot pressure relief inlet ports. Each check valve includes a ball 146, a mating seat 148 and a retaining spring 150 which is secured in position by a small bracket (not shown). In an alternate embodiment, the ball checks are simply held in their approximate position by a cage. Back pressure from the pilot pressure line 94 or 96 having the higher pressure, forces the ball in the lower pressure line against its seat, thereby preventing cross feed between the two servo positioners 60 and 62.

Figure 7:
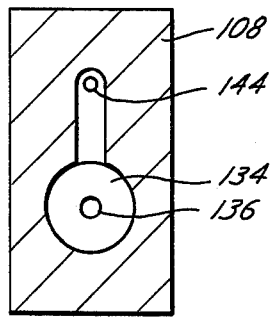
FIG. 7 is a cross sectional view of the torque equalizer valve taken along line 7—7 of FIG. 5.
Figure 8:
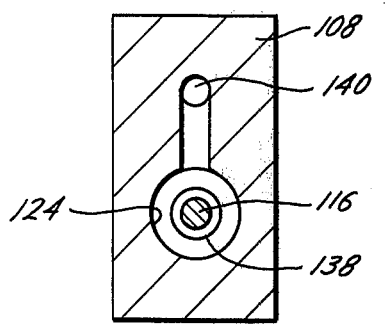
FIG. 8 is a cross section of the torque equalizer valve along lines 8—8 of FIG. 5.

FIGS. 7 and 8 are cross sections of the valve along lines 8—8 to show more clearly the details of the drive-pressure check valve and the bypass lines.

The torque equalizer valve has been described in terms of a simple pressure centered hydraulic spool valve. An imbalance in drive pressures on opposite ends of the spool causes the spool to move to expose the pilot pressure relief outlet port to one of the pilot pressure relief inlet ports. With a reduction in pilot pressure, the displacement of the corresponding pump is reduced to restore the drive pressure balance between the front and rear drive systems. The valve, as disclosed, may be used in conjunction with any type of hydraulic drive controller, be it a purely mechanical linkage as described, or an electrical feedback controller such as the Moog 62-500 or 62-600 units. All that is necessary is to connect the torque equalizer in parallel with the pilot pressure lines of the pump displacement controllers of the two systems. Electrical feedback controllers are described in U.S. Pat. Nos. 3,065,735 and 3,228,423.

In an alternate embodiment of the torque equalizer, pilot pressure relief inlet ports 100, 100' (FIG. 5) and pilot pressure relief outlet port 102 are eliminated. In place of the center spool, a rack is substituted. The rack engages a pinion to which is attached a potentiometer. As the spindle moves one way or the other in response to drive pressure imbalances, the potentiometer is rotated by the rack and pinion mechanism. The potentiometer is electrically connected to the electrical feedback circuitry of the two pump displacement controllers and coacts with them to restore the drive pressure balance between the two systems. The disadvantage of the rack and pinion mechanism is, of course, the fact that its use is restricted to electrical controllers.

As was pointed out earlier, in connection with FIG. 5 the center spool 118 is flat over a center portion 130. The outer ends 132, 132' are tapered about 2°. As spindle 116 moves to the left, for example, the taper provides an inital restriction to prevent an abrupt release of pilot fluid from inlet port 100 through outlet port 102. The volume of flow gradually increases as the spindle moves farther to the left and the tapered portion of the center spool slowly widens the effective aperture. The total travel of spindle 116 in either direction is limited such that the square face of the center spool 118 never completely clears inlet port 100 to fully open the pilot pressure inlet line to drain. By virtue of the amount of taper and the restricted spindle travel, the amount of drive pressure equalization is a selected fraction of the total drive pressure differential existing across the two closed-circuit hydraulic drive systems. Using a preferred taper of 2°, the effective drive pressure equalization is about 20% of the drive pressure differential. More taper, up to 5°, would allow a greater effective equalization percentage of up to about 70%. It is necessary to limit the effective drive pressure equalization percentage to a reasonable fractional value to prevent undesired, violent pressure surges between the drive systems which could damage the vehicle.

I claim as my invention:

1. In a hydraulically driven vehicle, a system comprising at least a first and a second variable-displacement hydraulic pump wherein each said hydraulic pump drives first and second independent hydraulic propulsion means through separate fluid-drive circuits that are inhibited from fluid communication with one another, and in which means are provided for adjusting the displacement of, and hence the driving force delivered by, each said pump in response to a variation of a pilot pressure, the improvement comprising:
   directly sensing an imbalance between the hydraulic fluid-drive pressures in said separate fluid drive circuits; and
   means responsive to said imbalance for changing the pilot pressure applied to the displacement adjusting means in one of said first and second hydraulic pumps so that a change in displacement of said one pump restores equalization of the driving forces delivered to the two independent propulsion means.

2. A hydraulic pump control system for hydraulically driven four wheel drive vehicles comprising:
   separate drive means for applying torque to front and rear wheels of said vehicle;
   first hydraulic pump means for powering the front wheel drive means;
   first pilot pressure control means for regulating the drive pressure output of said first pump means;
   second hydraulic pump means for powering the rear wheel drive means;
   second pilot pressure means for regulating the drive pressure output of said second pump means;
   a drain for receiving excess hydraulic fluid;
   a normally closed equalizer valve having a body for equalizing the output drive pressures of said two pumps, said equalizer valve including a spindle assembly having opposite end faces, movable within a longitudinal chamber in said housing and having a center spool;
   means for applying the output drive pressures from said first and second pumps to the respective end faces of said spindle to displace said spindle in the direction of the lower output drive pressure when the output drive pressures differ;
   a common pilot fluid path communicating between the center of said longitudinal chamber and said drain, said common pilot fluid path being blocked by said center spool when said output drive pressures are substantially the same and said spindle assembly is centered;
   first and second pilot fluid paths opening into said chamber on respective opposite sides of the center of said chamber, a one of said fluid paths being opened to fluid communication with said common fluid path only when said spindle assembly is displaced from center when said output drive pressures differ;
   means coupling said first and second pilot fluid paths to said respective first and second pilot pressure control means to decrease the output drive pressure of the pump applying the greater drive pressure to one end face of said spindle assembly, thereby to equalize the drive pressures applied to the opposite end faces.

3. The hydraulic pump control system as defined by claim 2 incruding:
   means, associated with the output drive pressure applying means, for damping the movement of said spindle assembly when said assembly is subjected to abrupt changes in the output drive pressures applied to said opposite end faces.

4. The hydraulic pump control system as defined by claim 3 wherein said damping means includes an adjustable metering orifice to relieve the back pressure against the spindle end face exposed to the lower hydrostatic drive pressure.

5. The hydraulic pump control system as defined by claim 2 wherein:

said center spool is tapered to limit the output drive pressure equalization to a preselected fraction of the full output drive pressure differential and to prevent abrupt surges in the pilot fluid pressure.

6. The hydraulic pump control system as defined by claim 5 wherein:

the angle of said taper is in the range of 2° to 5° to provide a fractional pressure equalization in the range of 20% to 70%.

7. In a fluid drive system for a vehicle having at least two sets of tractive means and a fluidly driven motor coupled to each set of tractive means, a variable displacement pump fluidly connected to each motor for supplying drive-fluid at a pressure proportional to the pump displacement, a servo control for changing the pump displacement in proportion to the pressure of a pilot fluid applied thereto, and common prime mover to drive said pumps, the improvement wherein:

each said motor and its associated fluidly-connected pump forms an independent, closed fluid-drive circuit, the circuits being inhibited from fluid communication with one another;

a torque equalizer is connected between said fluid-drive circuits for sensing a difference in drive pressure therebetween and in response to a drive pressure difference, for changing the pilot-fluid pressure applied to the servo of one of the pumps so that the displacement of said one pump is adjusted to equalize the drive-fluid pressure between the two closed fluid-drive circuits;

a vehicle drive-controller means is fluidly coupled to each pump servo for controlling the motion of said vehicle; and said torque equalizer has two fluid inputs blocked from intercommunication with one another, and two fluid outputs, the fluid inputs being fluidly connected to the respective closed fluid drive circuits and the two fluid outputs being fluidly connected in parallel with said drive controllers to maintain a pressure balance between the two closed fluid drive circuits.

* * * * *

UNITED STATES PATENT AND TRADEMARK OFFICE
CERTIFICATE OF CORRECTION

PATENT NO. : 4,116,294

DATED : September 26, 1978

INVENTOR(S) : Otis A. Johnston

It is certified that error appears in the above—identified patent and that said Letters Patent are hereby corrected as shown below:

In Claim 1, at Col. 8, line 3, before "directly sensing" insert
--- means for ---.

Signed and Sealed this

Twenty-fifth Day of December 1979

[SEAL]

Attest:

SIDNEY A. DIAMOND

Attesting Officer

Commissioner of Patents and Trademarks